(12) United States Patent
Fröhlich et al.

(10) Patent No.: US 12,670,447 B2
(45) Date of Patent: Jun. 30, 2026

(54) SUPPORT MODEL AND ORCHESTRATION PROCEDURE FOR MANUAL LABELING PROCESSES

(71) Applicant: Dell Products L.P., Round Rock, TX (US)

(72) Inventors: Herberth Birck Fröhlich, Florianópolis (BR); Paulo Abelha Ferreira, Rio de Janeiro (BR); Vinicius Michel Gottin, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 672 days.

(21) Appl. No.: 18/175,117

(22) Filed: Feb. 27, 2023

(65) Prior Publication Data

US 2024/0289697 A1 Aug. 29, 2024

(51) Int. Cl.
*G06N 20/20* (2019.01)

(52) U.S. Cl.
CPC .................................... *G06N 20/20* (2019.01)

(58) Field of Classification Search
CPC ...................................................... G06N 20/20
USPC ............................................................ 706/12
See application file for complete search history.

(56) References Cited

U.S. PATENT DOCUMENTS

| | | | | |
|---|---|---|---|---|
| 10,963,734 B1* | 3/2021 | Wang | ........................ | G06T 7/74 |
| 12,271,443 B1* | 4/2025 | Ardila | .................... | G06V 10/70 |
| 2023/0029608 A1* | 2/2023 | Chafni | .................. | G06N 20/00 |
| 2025/0068960 A1* | 2/2025 | Yu | ............................ | G06N 3/08 |

OTHER PUBLICATIONS

Marin-Castro et al., "Automatic image annotation using a semi-supervised ensemble of classifiers", CIARP 2017, 2017 (Year: 2017).*
Oza et al., "Classifier ensembles: select real-world applications", Information fusion 9 (2008) 4-20, 2008 (Year: 2008).*
Vajda et al., "A semi-supervised ensemble learning approach for character labeling with minimal human effort", 2011 International conference on document analysis and recognition, 2011 (Year: 2011).*
Fanaee-T et al., "Event labeling combining ensemble detectors and background knowledge", Prog Artif Intell (2-014) 2:113-127, 2014 (Year: 2014).*

* cited by examiner

*Primary Examiner* — Tsu-Chang Lee
(74) *Attorney, Agent, or Firm* — Workman Nydegger

(57) ABSTRACT

Labelling in machine learning is disclosed. Assistant models are trained to generate the labelling behavior of corresponding labelers. When an observation is received, the label generated by the assistant model is compared to the user-generated label. If the labels are different, an ensemble operation is performed wherein multiple assistant models, each configured to mimic the labelling behavior of a different user, are used to resolve the conflict and determine a final label for the observation. Labels generated by the ensemble operation may be incorporated into retraining operations performed to retrain the assistant models.

18 Claims, 7 Drawing Sheets

600

SUPPORT MODEL AND ORCHESTRATION PROCEDURE FOR MANUAL LABELING PROCESSES

FIELD OF THE INVENTION

Embodiments of the present invention generally relate to machine learning and machine learning models. More particularly, at least some embodiments of the invention relate to systems, hardware, software, computer-readable media, and methods for acquiring labeled data and to automated labeling.

BACKGROUND

One of the reasons behind the success of machine learning is the increased availability of data. As the volume and quality of the data increases, the quality and performance of artificial intelligence/machine learning (AI/ML) also improves. Consequently, businesses and other entities are switching to data centric artificial intelligence/machine learning processes.

The dominant paradigm for training machine learning models is supervised learning. Supervised learning requires labeled data. One of the drawbacks to labeled data is that the data is often labeled by human labelers. Different labelers may apply different labels or classifications to the same observations. This introduces conflict and subjectivity into the labeling processes.

In addition to the problem of inconsistent or conflicting labeling, a lot of the data being labeled is private or sensitive. From one perspective, labelers may not want to be exposed to certain types of content. From another perspective, there may be a desire to prevent the data from being exposed to multiple labelers. This desire to protect the data conflicts with the need to share data or publicly disclose data to a large set of human labelers in order to effectively label the data. The desire of labelers to not be exposed to certain content conflicts with the need to label the data.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to machine learning and machine learning models. More particularly, at least some embodiments of the invention relate to systems, hardware, software, computer-readable media, and methods for labeling data and to automated labeling operations in machine learning/artificial intelligence.

In general, example embodiments of the invention relate to a process of acquiring labeled data that improves label conflict management and decreases sensitive data disclosures. A framework is provided to train assistant models, which are examples of machine learning models, that are configured or trained to mimic the behavior of human labelers. The framework may also orchestrate conflict resolution operations when labeling conflicts arise.

In one example, assistant models configured to mimic the labeling behavior of a human user or labeler are trained and deployed. Each of the assistant models is trained to mimic the behavior of a specific human labeler. The goal is to train the assistant model such that the assistant model generates the same label provided by the human labeler.

Thus, the assistant models are trained incrementally over time until there is sufficient similarity between the outputs or classifications of the assistant models and their associated human labelers. In other words, each assistant model is trained to mimic a corresponding human labeler.

Once the assistant models are trained, each observation received by a labeler (a human labeler) is also provided to the assistant model associated with that labeler. The outputs or labels are then compared. If the outputs or labels are different, the observation may be provided to other assistant models for inference instead of to other human labelers. The responses of the other assistance models are gathered by majority vote and the label that receives the most votes is assigned or associated with the observation and may be incorporated into the assistant models during subsequent training operations. Alternatively, the decision (e.g., label that received the most votes or that was the most common output) made by the assistant models may be provided to the initial human labeler for instruction or confirmation.

When the output (e.g., label) of a trained assistance model for an observation diverges from the label generated by the corresponding human labeler, the observations are subject to an ensemble operation and evaluation by multiple assistant models. Observations whose labels do not diverge do not need to be sent to other human labelers. In both cases, the number of human labelers exposed to the observation can be reduced while still ensuring that the observation is labeled.

Embodiments of the invention thus relate to a framework for training and deploying assistant models that are able to collectively perform conflict management and reduce the disclosure of sensitive data.

Figure 1:
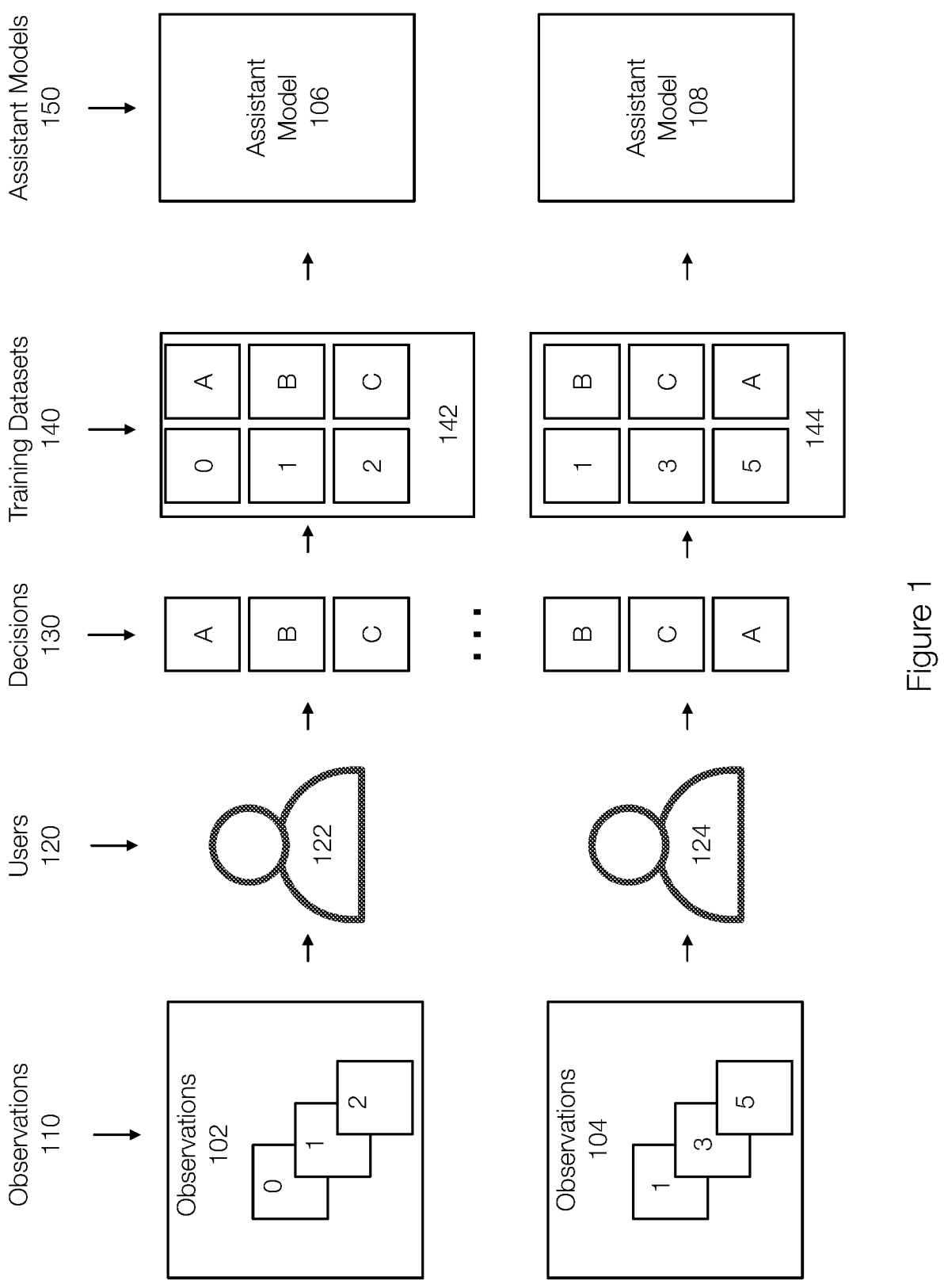
FIG. 1 discloses aspects of training assistance models to label observations or other data during an offline stage.

FIG. 1 discloses aspects of training assistant models. FIG. 1 illustrates an offline stage of training an assistant model for each human user/labeler. Generally, users 120 are provided with observations 110. The observations provided to each individual user may be the same as or different from the observations provided to other users.

The users 120 generate decisions 130 for the observations 110. In other words, the users provide each of the observations 110 with a label when making decisions 130 about the observations 110. Over time, the users 120 are associated with training datasets 140. The training datasets 140 includes the observations and the labels assigned to those observations by the users 120. The training datasets 140 are used to train assistant models 150.

This process of the training assistant models, however, is performed on an individual basis. This ensures that a particular assistant model is trained specifically for a particular user/labeler. In other words, the process of training an assistant model 150 is specific to each of the users 120. Thus, each of the users 120 is associated with an assistant model 150. Because the training datasets 150 of the individual users 120 are different, the assistant models 150 may generate different inferences when presented with new observations or samples.

The assistant models 150 may be trained using labeled data and may be trained to learn multiple classifications. Thus, the output of the assistant models 150 may be the most likely classification of the learned classifications and may be expressed as a probability. As used herein the classification is, in effect, the label assigned to the input observation.

FIG. 1 illustrates this general process for specific users. In FIG. 1, observations 102 are presented to the user 122 and the user 122 makes a decision and applies a label to each of the observations 102. Thus, the user 122 applies a label of A, B, and C to, respectively, the observations 0, 1, and 2. The training dataset 142 for the assistant model 106 thus includes the labeled observations 0-A, 1-B, and 2-C. The assistant model 106 is trained accordingly with the training dataset 142. Because the training dataset 142 includes labels applied, in one example, only by the user 122, the trained assistant model 106 is configured to mimic the labeling behavior of the user 122.

Similarly, the user 124 labels the observations 104, which includes samples or observations 1, 3, and 5 with, respectively, labels B, C, and A. This results in a training dataset 144 that includes labeled observations 1-B, 3-C, and 5-A. The training dataset 144, which is distinct and different from the training dataset 142, is used to train the assistant model 108. Further, inferences or classifications output by the assistant models 106 and 108 for the same input observation may differ accordingly. Thus, in this example, the trained assistant model 106 captures or learns the labeling preferences of the user 122 and the assistant model 108 captures or learns the labeling preferences of the user 124.

The training datasets 140, such as the training datasets 142 and 144, may be saved for a period of time until, in one example, sufficient data is available to train the corresponding assistant models 150. The assistant models 150 may be trained all at once, in batches, or the like. Regardless of how the assistant models are trained, each is trained with user-specific data. In one example, the training datasets of samples-labels for each of the users 122 and 124 are considered independently and in isolation. During the training or offline stage illustrated in FIG. 1, all types of inputs or observations should be labeled by the respective users 120.

The assistant model 150 may be configured to perform a particular task. By way of example, the assistant model 150 may be an image classification model or the like. Embodiments of the invention, however, are not limited to image classification models.

The assistant models 150, once trained, may be used in an online stage of labeling observations. In one example, when a labeling conflict arises, the assistant models 150 can reduce the need to present the conflicting labels and/or corresponding observations to multiple users. Embodiments of the invention can resolve these conflicts without involving the users 120.

Figure 2:
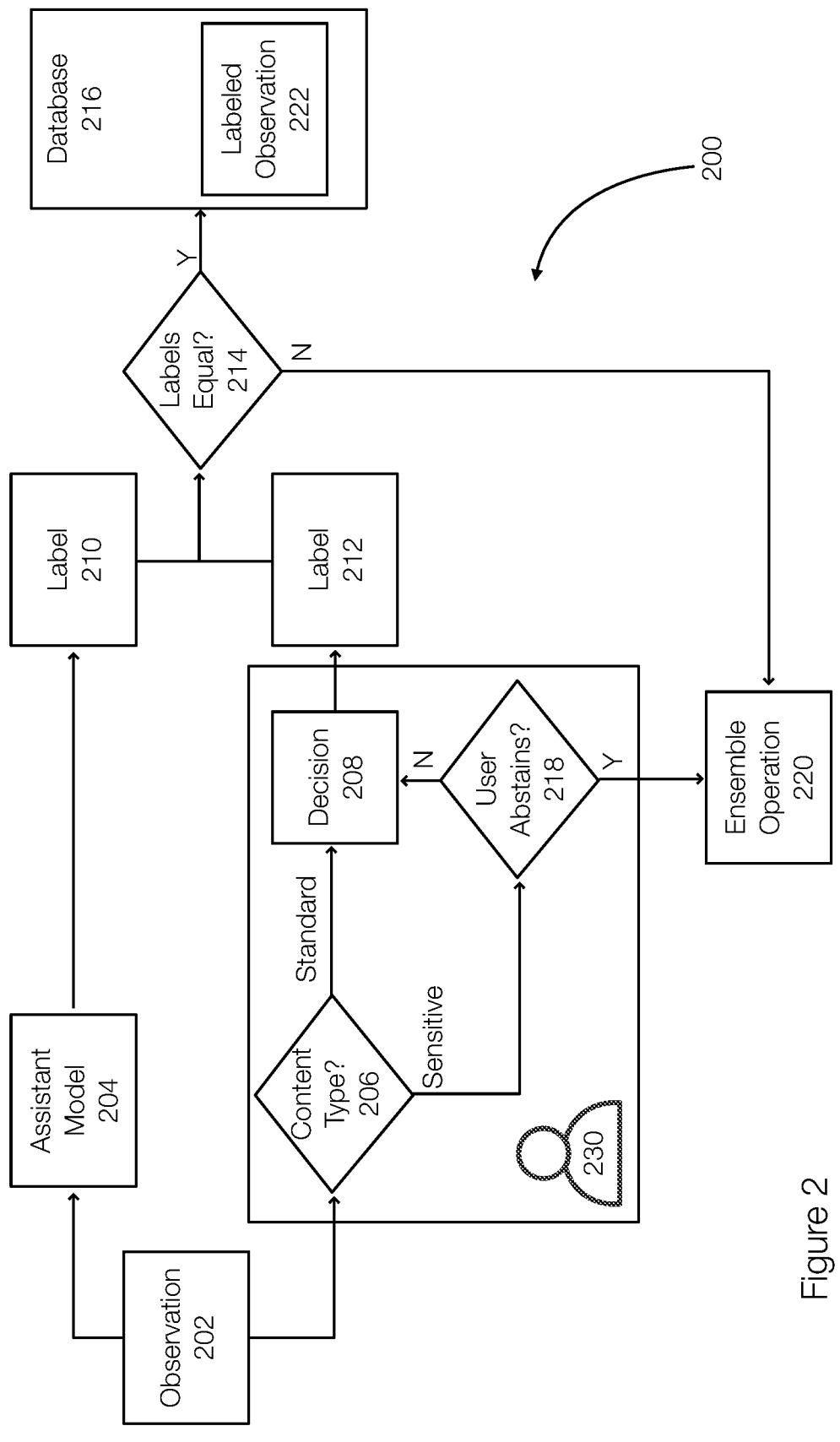
FIG. 2 discloses aspects of an online stage that includes operating assistant models to label data, resolve labeling conflicts, and/or reduce sensitive data disclosures.

FIG. 2 discloses aspects of an online stage that includes operating assistant models to label data, resolve labeling conflicts, and/or reduce sensitive data disclosures. FIG. 2 illustrates a labeling pipeline 200. The pipeline 200 is generally configured to provide an input, such as an observation, to both a user and their corresponding assistant model. The label applied or determined by the user and inferred by the assistant model are compared. If the labels match, the observation and corresponding label may be stored in a database. If the labels do not match or conflict (e.g., diverge), the pipeline 200 is configured to resolve the conflict. The pipeline 200 also allows a user to decide that the observation includes sensitive content and allows the user to abstain from making a decision (applying a label). In response, the pipeline 200 may generate a label automatically in a manner that is similar to the manner in which conflicts in labeling (e.g., the labels generated by the user and the assistant model do not match) are resolved.

More specifically, FIG. 2 illustrates a user 230 and an assistant model 204 that is trained to mimic or approximate the labeling behavior of the user 230. In this example, an observation 202 (observation i) is received. The observation 202 is provided as input to an assistant model 204 ($AM_j$) and provided to the corresponding user 230 (labeler j). The user 230 may determine a content type of the observation at 206. If the content type is standard, the user 230 may make a decision 208 and generate a label 212 (user generated label $l_j$) for the observation 202. If the content type is sensitive, the user 230 may abstain (Y at 218) from generating a label or from reviewing the observation. If the user does not abstain (N at 218), the user 230 may make a decision 208 and generate the label 212.

If the user abstains from viewing and/or labeling the observation 202, the observation 202 may be subject to an ensemble operation 220 described with reference to FIG. 3 as the method 300 below. The user 230 may abstain for various reasons (e.g., willingly abstain, harmful content, mental health).

The observation 202 is also input to the assistant model 204. The assistant model 204 generates a model generated label 210 ($l_{AMj}$). If the user has generated the label 212, the label 210 is compared to the label 212 (e.g., $l_j = l_{AMj}$?). If the labels match or are equal (Y at 214), the labeled observation 222 ($i$–$l_j$) is stored in the database 216 ($D_j$). The database 216 is specific to data labeled the same by the user 230 and the assistant model 204 in one example.

More specifically, the assistant model 204 may classify the observation 202 into one of multiple learned classes. For example, the assistant model 204 may infer that the observation belongs in class A while the user 230 also determines that the observation belongs in class A (the labels match (Y at 214)). If the labels or classifications do not match (N at 214), the ensemble operation is performed as described in FIG. 3.

Storing the labeled observation 222 in the database 216 allows this labeling decision to be reinforced in future operations and decisions. For example, if the assistant model 204 is retrained, the retraining operation may use the database 216. This ensures that the assistant model 204 continues to reflect the preferences and idiosyncrasies of the corresponding human labeler/user 230.

Figure 3:
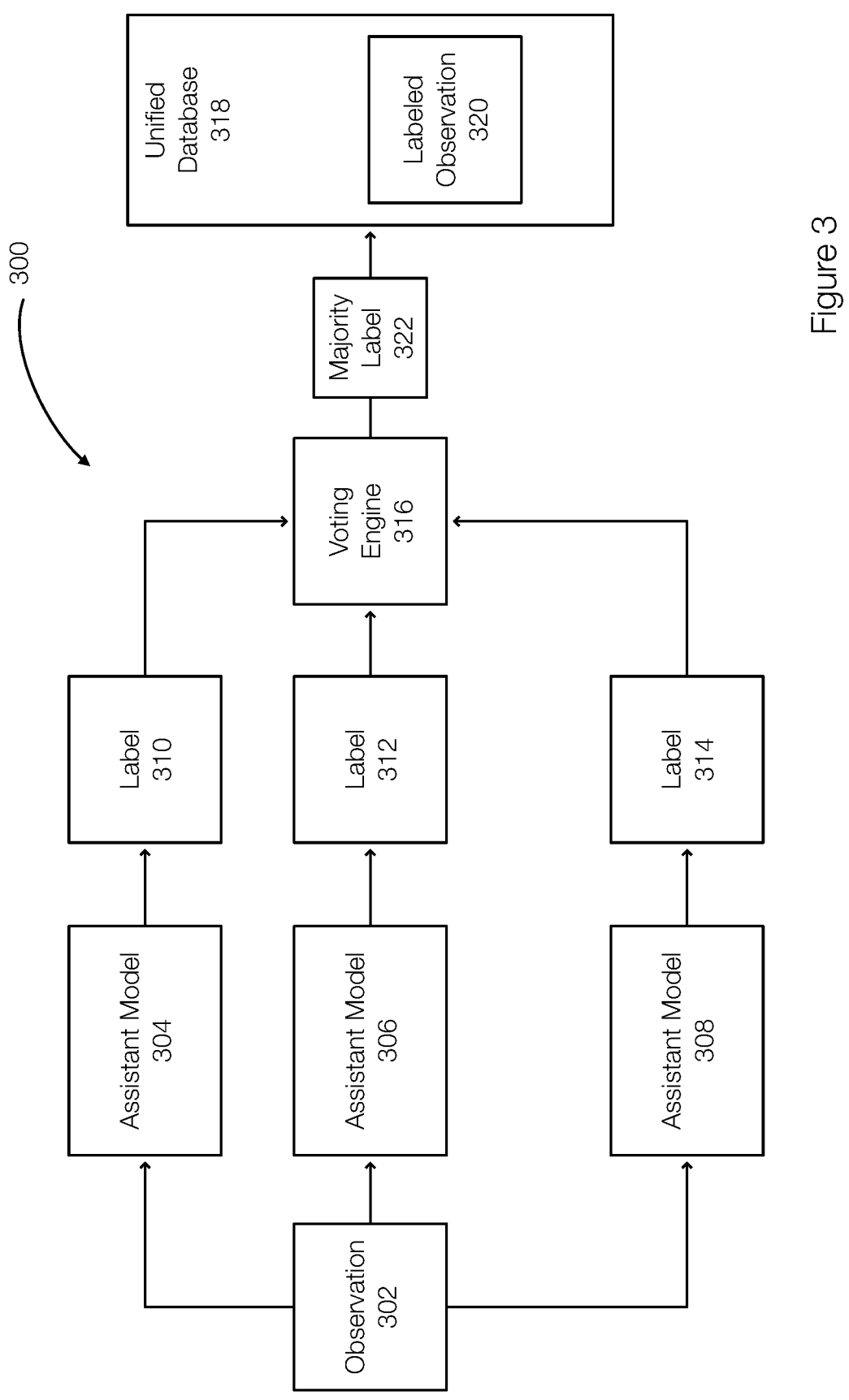
FIG. 3 discloses aspects of an ensemble operation to resolve labeling conflicts.

FIG. 3 discloses aspects of an ensemble operation to resolve labeling conflicts. The method 300 is an example of the ensemble operation 220. FIG. 3 illustrates an observation

302 that is subject to a decision conflict and/or subject to user abstention. In this example, the observation 302 (observation i) is provided as input to multiple assistant models (e.g., $AM_1$ . . . $AM_n$) represented by assistant models 304, 306, and 308. Each of these models generates a corresponding label (e.g., $l_{AM1}$ . . . $l_{AMn}$) or classification, represented by the labels 310, 312, and 314, for the observation 302.

A voting engine 316 may be configured to evaluate the labels 310, 312, and 314. In effect, each of the classifications or inferences generated by the assistant models 304, 406, and 308 constitute a vote. The label that receives the most votes or the classification that is output the most may be determined to be the label assigned to the observation 302. The voting engine 316 identifies a majority label 322 (label $l_{AM}$). The observation-label combination (i–$l_{AM}$) is stored in a unified database ($\mathbb{D}_{AM}$) as the labeled observation 320.

In one example, the voting engine 316 may place a requirement on the number of votes required prior to storing the observation-label in the unified database 318. For example, if there are n assistant models, the voting engine 316 may require at least 50% or greater than 50% of the labels or classifications for the observation 302 to be the same. Alternatively, a plurality of votes may be sufficient. For example, if there are 10 assistant models and 4 of the models (less than 50%) output the same classification or label, that classification is assigned or associated to the observation as long as no other label received more than 3 votes.

The unified database 318 may be used for subsequent training operations such that the labeled observations included in the unified database 318 can be incorporated into training the individual assistant models. The unified database 318 represents, in one example, a consensus view of all the assistant models and is, as a result, more likely to be the correct label.

The ensemble operation 300 may not be performed immediately in response to a detected conflict. For example, the ensemble operation 300 may collect multiple observations that are subject to the ensemble operation 300 and then perform a batch of ensemble operations. As a result, the inference generated by the assistant model 204, which is the label 210 or $l_{AMj}$, may not be available when the ensemble operation is performed and the assistant model 204 may need generate the label again in the ensemble operation 300.

Figure 4:
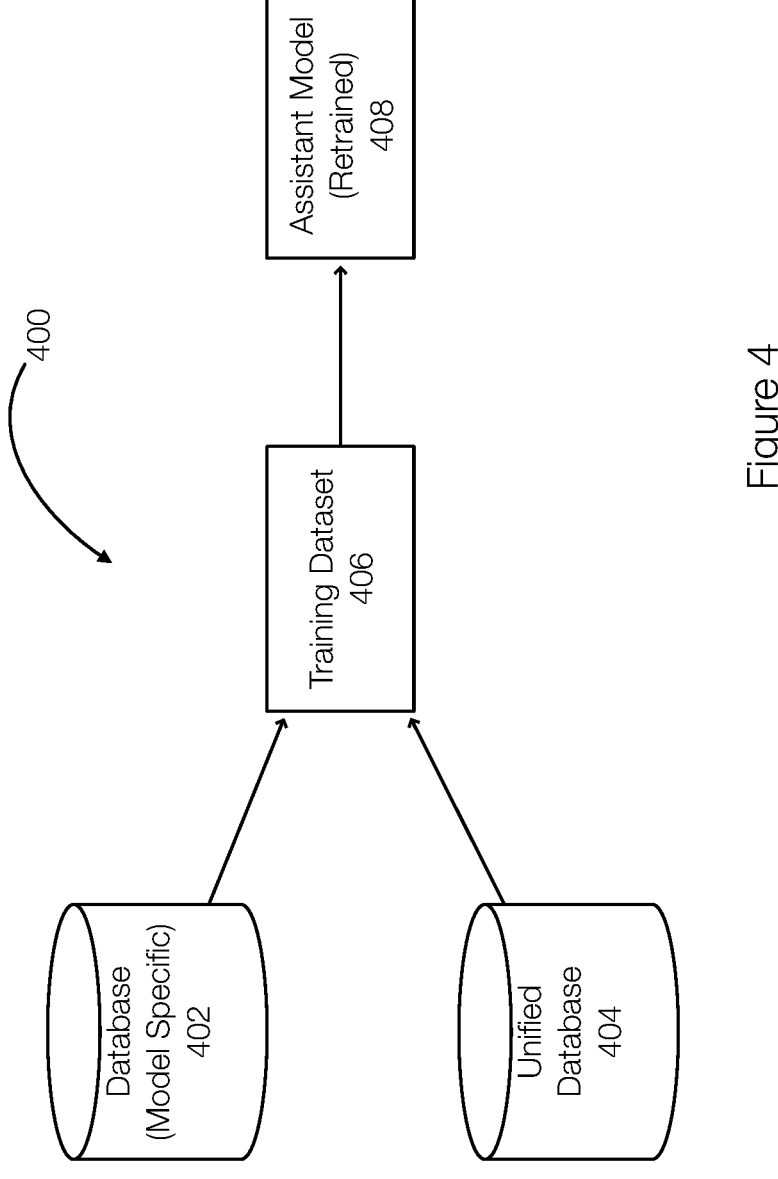
FIG. 4 illustrates aspects of a training (or retraining) operation to retrain or update one or more of the assistant models.

FIG. 4 illustrates aspects of a training (or retraining) operation to retrain or update one or more of the assistant models. FIG. 4 illustrates that a training dataset 406 may include or be derived from a database 402 and a unified database 404. In this example, the assistant model 408 is being retrained. If the assistant model 408 is associated with a user or labeler j, then the database 402, which is model specific, is that users database–$D_j$. The unified database 404 is the database $\mathbb{D}_{AM}$. The database 402 (Di) includes instances or pairs (observation-label) that keeps the assistant model 408 representative of the decision-making behavior of the respective labeler j. The database 404 ($\mathbb{D}_{AM}$) generally includes correct, based on the ensemble operation, labels for observations that may not have been reviewed by human labelers. The retraining operation 400 ensures that the retrained assistant model 408 improves its labeling capabilities while still representing the decision making behavior and tendencies of the corresponding user.

Figure 5:
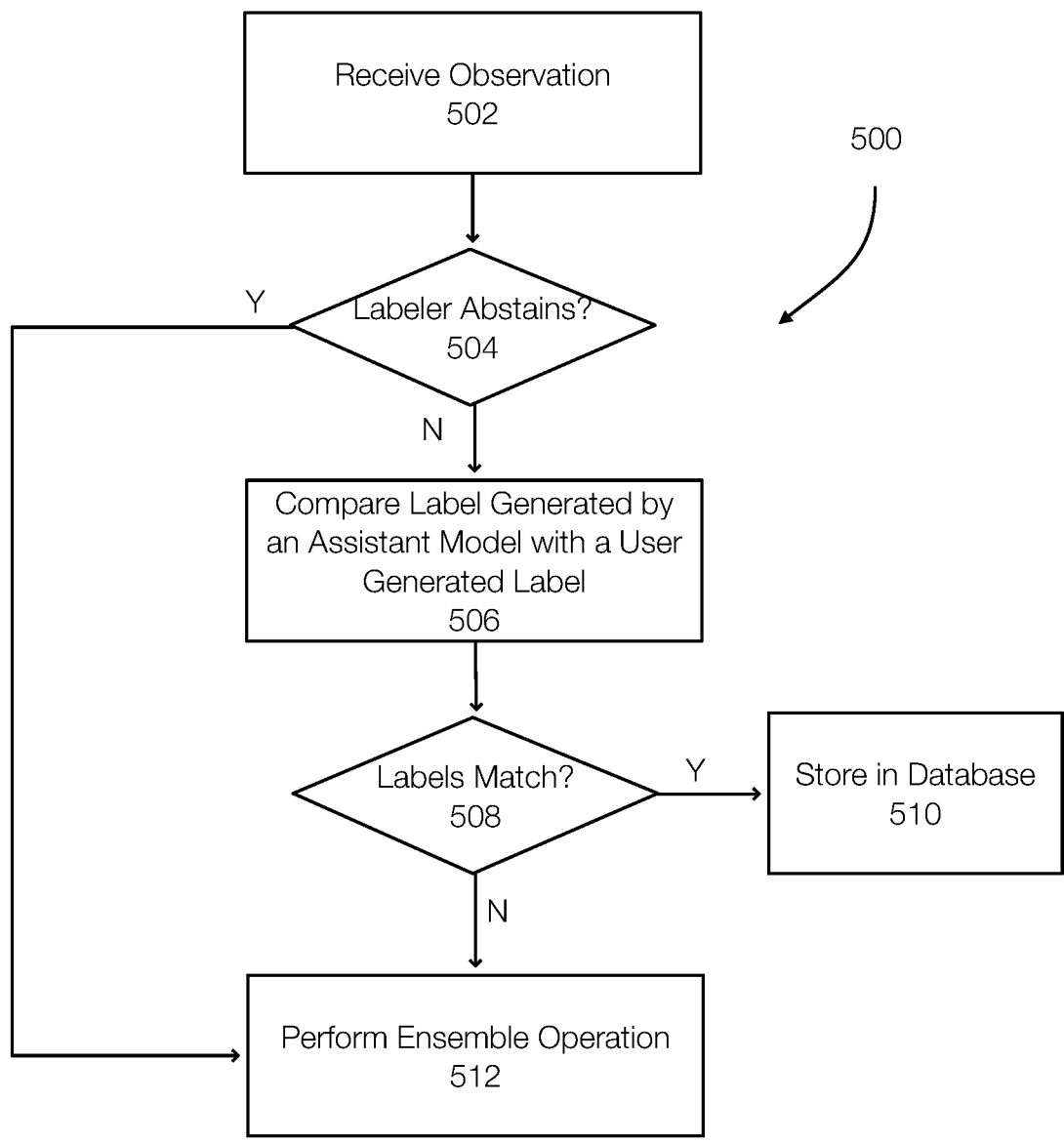
FIG. 5 discloses aspects of labeling observations.

FIG. 5 discloses aspects of a method for labeling observations. The method 500 includes receiving 502 an observation. The observation may be data to be labeled and included in a dataset. Although the labeled observation may be used to train different types of machine learning models for various purposes, embodiments of the invention may used the labeled observation to train a model to mimic or approximate labeling decisions of a specific user.

If the labeler does not abstain (and/or the observation is not sensitive (N at 504) and assuming that an assistant model has been trained, the label inferred by the assistant model and the label provided by the corresponding user are compared 506. If the labels match (Y at 508), the observation-label may be stored 510 in a database that may be specific to the user. If the labels to not match (N at 508) or the user labeler abstained (Y at 504), an ensemble operation is performed 512.

Figure 6:
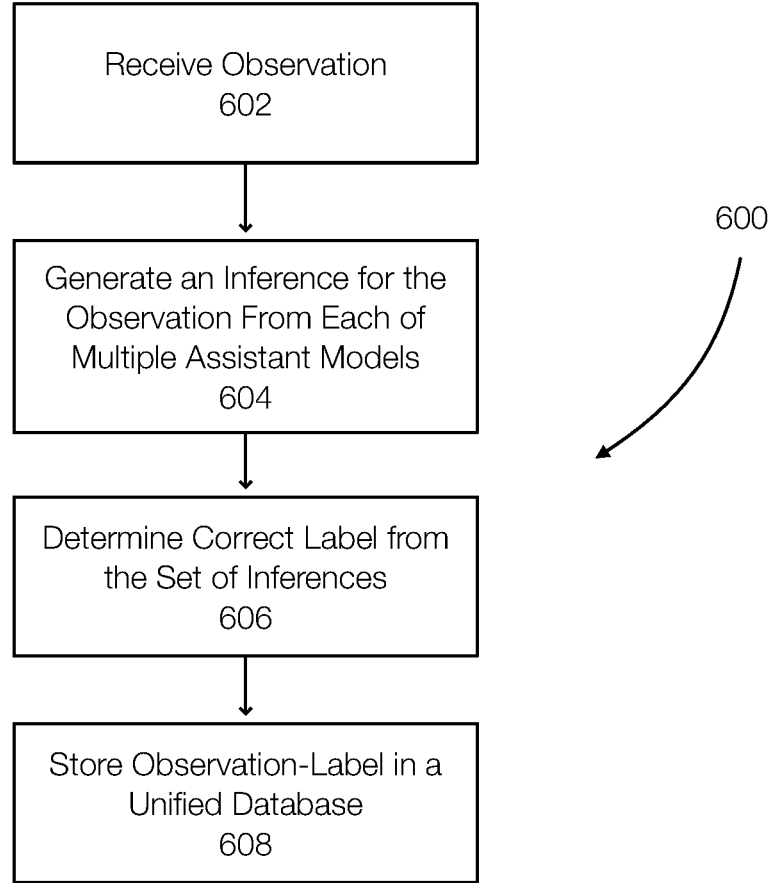
FIG. 6 discloses aspects of an ensemble operation.

FIG. 6 discloses aspects of an ensemble operation. The method 600 includes receiving 602 an observation. In one example, the observation was not reviewed by a human reviewer. In another example, a label generated by a labeler did not match the label generated by an assistant model configured to mimic the labeler's behavior.

In either of these cases, an inference is generated 604 by each of multiple assistant models. This results in a set of inferences or set of labels that would likely be generated by a set of labelers because each the assistant models have been trained to mimic a corresponding labeler.

The correct or presumably correct label is then determined 606 from the set of labels. The decision or selection of a label from the set of labels may be based on which label was inferred most frequently by the assistant models. The selected label is associated with the observation and stored 608 in a unified database. The unified database includes data for observations whose labels were determined using multiple assistant models. If a label cannot be selected from the set of labels, embodiments of the invention may refer the observation to a user.

Figure 7:
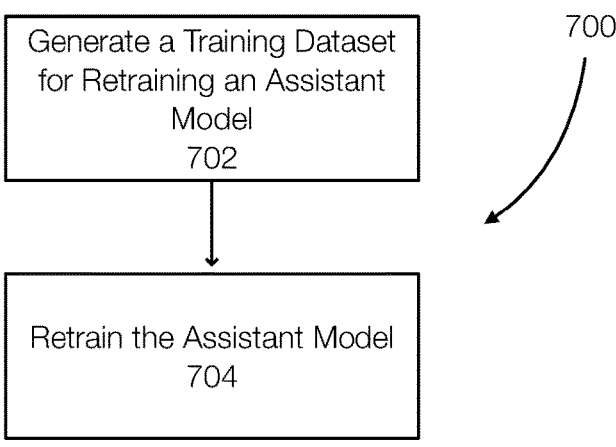
FIG. 7 discloses aspects of training an assistant model.

FIG. 7 discloses aspects of training an assistant model. The method 700 is configured to train a specific assistant model and, more specifically, to retrain the assistant model. More specifically, the method 700 generates 702 a training dataset for training a specific assistant model. The training set generated by the method 700 depends on the assistant model being trained. The training dataset is generated or includes a database that includes data previously labeled by the assistant model being trained and associated with the specific user. When a user or labeler and the labeler's corresponding assistant model generate the same label for an observation, that data is stored in the model's corresponding database, which may be used in the method 700.

Part of the training dataset may also include data from a unified database, which includes observation-label data for observations that were labeled by multiple assistant models collectively. Once the training dataset is generated, the assistant model is retrained 704.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, labeling operations, training operations, ensemble operations, voting operations, automated label assignment operations, or the like or combinations thereof. More generally, the scope of the invention embraces any operating environment in which the disclosed concepts may be useful.

New and/or modified data collected and/or generated in connection with some embodiments, may be stored in a computing environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to perform services and operations initiated by one or more clients or other elements of the operating environment.

Example cloud computing environments, which may or may not be public, include storage environments that may provide data functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices or storage systems in the operating environment may take the form of software, physical machines, containers, or VMs, or any combination of these, though no particular device implementation or configuration is required for any embodiment.

As used herein, the term 'data' is intended to be broad in scope. Thus, that term embraces, by way of example and not limitation, observations, labels, or combinations thereof. Example embodiments of the invention are applicable to any system capable of storing and handling various types of objects, in analog, digital, or other form.

It is noted that any operation(s) of any of these methods discloses herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving a first label for an observation, wherein the firsts label is generated by an assistant model, receiving a second label for the observation, wherein the second label is generated by a user associated with the assistant model, comparing the first label with the second label, and performing an ensemble operation when the first label and the second label are different, wherein the ensemble operation includes determining a final label for the observation based on labels generated by a plurality of assistant models for the observation.

Embodiment 2. The method of embodiment 1, further comprising training the assistant model to mimic a labeling behavior of the user.

Embodiment 3. The method of embodiment 1 and/or 2, further comprising storing the first label and the observation in a database associated with the user when the first label and the second label match.

Embodiment 4. The method of embodiment 1, 2, and/or 3, further comprising performing the ensemble operation when the observation is associated with sensitive content and the user declines to generate the second label.

Embodiment 5. The method of embodiment 1, 2, 3, and/or 4, wherein the assistant model is trained with data labeled by the user such that the assistant model mimics labeling of the user.

Embodiment 6. The method of embodiment 1, 2, 3, 4, and/or 5, wherein the ensemble operation includes inputting the observation to each of the plurality of assistant models, the plurality of assistant models including the assistant model, wherein each of the plurality of assistant models is configured to mimic labeling behavior of a different user.

Embodiment 7. The method of embodiment 1, 2, 3, 4, 5, and/or 6, wherein a set of labels is generated by the plurality of assistant models.

Embodiment 8. The method of embodiment 1, 2, 3, 4, 5, 6, and/or 7, further comprising selecting a most common label from the set of labels as the final label.

Embodiment 9. The method of embodiment 1, 2, 3, 4, 5, 6, 7, and/or 8, further comprising storing the most common label and the observation in a unified database, wherein labels in the unified database are only labeled by the plurality of assistant models.

Embodiment 10. The method of embodiment 1, 2, 3, 4, 5, 6, 7, 8, and/or 9, further comprising retraining the assistant model using the unified database and a database that includes labels generated by the assistant model that match labels generated by the user.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
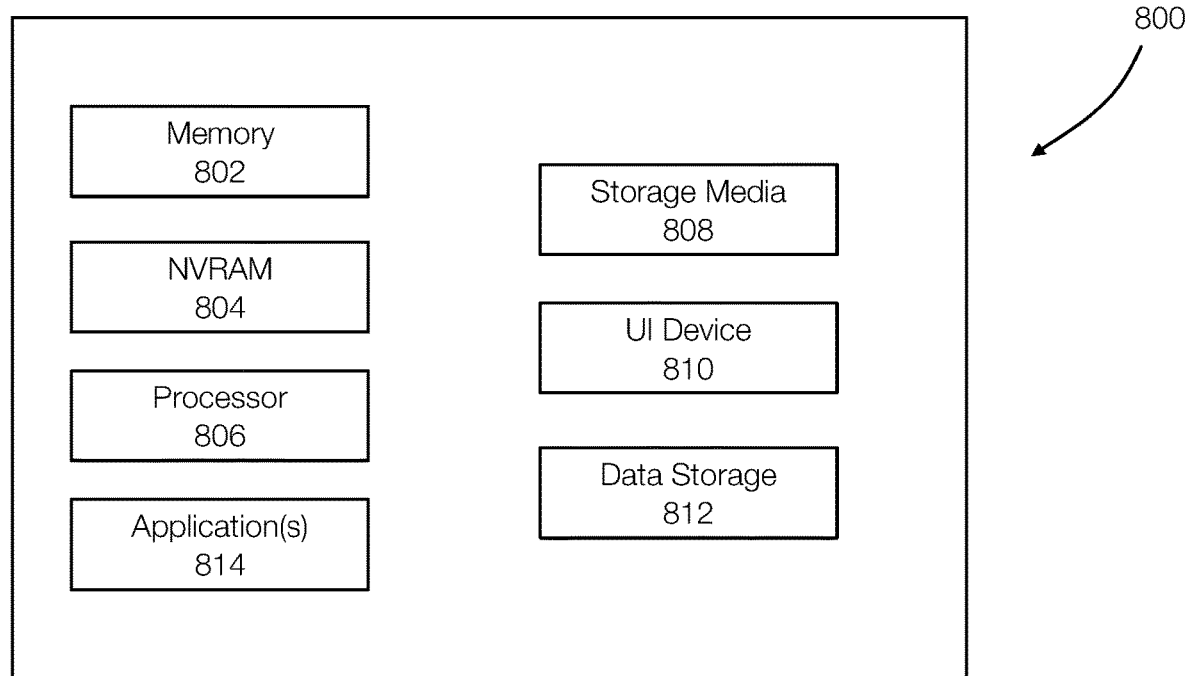
FIG. 8 discloses aspects of a computing device, system, or entity.

With reference briefly now to FIG. 8, any one or more of the entities disclosed, or implied, by the Figures and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    receiving a first label for an observation, wherein the first label is generated by an assistant model, the observation having a content type;
    when a user determines to review the observation when the content type is sensitive:
        receiving a second label for the observation, wherein the second label is generated by the user associated with the assistant model;
        comparing the first label with the second label; and
        performing an ensemble operation when the first label and the second label are different, wherein the first label is stored in a database when the first label and the second label are equal as a final label;
    when the user declines to review the observation, performing the ensemble operation; and
    wherein the ensemble operation includes determining the final label for the observation based on labels generated by a plurality of assistant models for the observation; and
    storing the final label determined by the ensemble operation in a unified database; and
    training the plurality of assistant models with the database and/or the unified database.

2. The method of claim 1, further comprising training the assistant model to mimic a labeling behavior of the user.

3. The method of claim 1, further comprising storing the first label and the observation in the database.

4. The method of claim 1, wherein the assistant model is trained with data labeled by the user such that the assistant model mimics labeling of the user.

5. The method of claim 1, wherein the ensemble operation includes inputting the observation to each of the plurality of assistant models, the plurality of assistant models including the assistant model, wherein each of the plurality of assistant models is configured to mimic labeling behavior of a different user.

6. The method of claim 5, wherein a set of labels is generated by the plurality of assistant models.

7. The method of claim 6, further comprising selecting a most common label from the set of labels as the final label.

8. The method of claim 7, further comprising storing the most common label and the observation in the unified database, wherein labels in the unified database are only labeled by the plurality of assistant models.

9. The method of claim 8, further comprising retraining the assistant model using the unified database and the database that includes labels generated by the assistant model that match labels generated by the user.

10. A non-transitory storage medium having stored therein instructions that are executable by one or more hardware processors to perform operations comprising:

receiving a first label for an observation, wherein the first label is generated by an assistant model, the observation having a content type;

when a user determines to review the observation when the content type is sensitive:

receiving a second label for the observation, wherein the second label is generated by the user associated with the assistant model;

comparing the first label with the second label; and performing an ensemble operation when the first label and the second label are different, wherein the first label is stored in a database when the first label and the second label are equal as a final label;

when the user declines to review the observation, performing the ensemble operation; and wherein the ensemble operation includes determining the final label for the observation based on labels generated by a plurality of assistant models for the observation; and storing the final label determined by the ensemble operation in a unified database; and training the plurality of assistant models with the database and/or the unified database.

11. The non-transitory storage medium of claim 10, further comprising training the assistant model to mimic a labeling behavior of the user.

12. The non-transitory storage medium of claim 10, further comprising storing the first label and the observation in the database.

13. The non-transitory storage medium of claim 10, wherein the assistant model is trained with data labeled by the user such that the assistant model mimics labeling of the user.

14. The non-transitory storage medium of claim 10, wherein the ensemble operation includes inputting the observation to each of the plurality of assistant models, the plurality of assistant models including the assistant model, wherein each of the plurality of assistant models is configured to mimic labeling behavior of a different user.

15. The non-transitory storage medium of claim 14, wherein a set of labels is generated by the plurality of assistant models.

16. The non-transitory storage medium of claim 15, further comprising selecting a most common label from the set of labels as the final label.

17. The non-transitory storage medium of claim 16, further comprising storing the most common label and the observation in the unified database, wherein labels in the unified database are only labeled by the plurality of assistant models.

18. The non-transitory storage medium of claim 17, further comprising retraining the assistant model using the unified database and the database that includes labels generated by the assistant model that match labels generated by the user.

\* \* \* \* \*